BUILDING WITH WALKWAYS AND A MALL

Original Filed Aug. 27, 1965 4 Sheets-Sheet 1

INVENTOR.
Gray Graham
Carness, Dickey & Pierce
ATTORNEYS.

BUILDING WITH WALKWAYS AND A MALL

Original Filed Aug. 27, 1965 4 Sheets-Sheet 2

INVENTOR
Gray Graham
Darness, Dickey & Pierce
ATTORNEYS.

BUILDING WITH WALKWAYS AND A MALL

Original Filed Aug. 27, 1965 4 Sheets-Sheet 3

INVENTOR.
Gray Graham
BY
Carness, Dickey & Pierce
ATTORNEYS.

BUILDING WITH WALKWAYS AND A MALL

Original Filed Aug. 27, 1965 4 Sheets-Sheet 4

INVENTOR.
Gray Graham
BY
Carness, Dickey & Pierce
ATTORNEYS.

United States Patent Office

Re. 27,341
Reissued Apr. 25, 1972

27,341

BUILDING WITH WALKWAYS AND A MALL

Gray Graham, 4138 Rich Drive, Waterford, Mich. 48095

Original No. 3,438,162, dated Apr. 15, 1969, Ser. No. 483,153, Aug. 27, 1965. Application for reissue May 25, 1970, Ser. No. 40,464

Int. Cl. E04h *6/42, 1/00;* E01f *9/00*

U.S. Cl. 52—175 15 Claims

Matter enclosed in heavy brackets [ ] appears in the original patent but forms no part of this reissue specification; matter printed in italics indicates the additions made by reissue.

ABSTRACT OF THE DISCLOSURE

A building assembly *consisting of spaced series of interconnected, non-coplanar levels. Each level is adapted to house building units that are set back from a walkway provided thereupon. The spaced series of levels define a mall and the walkways on the levels adjoin the mall. Interconnecting means permit the passage of people from one level to the other. Specifically the building is* made up of spaced inclined ramps extending at an acute angle to the horizontal and interconnected at their opposite ends by pairs of horizontally extending ramps.

*BACKGROUND OF THE INVENTION*

This invention relates to a building that is adapted to contain a plurality of separate units and more particularly to an improved building construction that offers maximum space utilization.

The ever increasing land cost in urban areas has created an increased demand for buildings that offer a maximum degree of area utilization. Although multi-storied buildings provide this advantage, the buildings heretofore proposed result in the formation of cities without cultural or park areas. In addition, the previously proposed buildings do not offer the maximum potential for retail utilization wherein a plurality of different stores may be housed in one building.

It is, therefore, a principal object of this invention to provide an improved building that offers maximum space utilization without sacrifice of recreational or outdoor area.

It is a further object of the invention to provide a building that may serve a variety of functions.

There has been a recent trend toward shopping center areas in retail merchandising. The known type of shopping center normally spreads over vast areas and does not have any true continuity. The smaller retail stores are frequently positioned in less desirable traffic areas and thus cannot take advantage of the full traffic of the shopping area. In addition, the display areas of these out of the way stores, have no real value since there is insufficient traffic past them.

It is, therefore, a still further object of this invention to provide an improved building that may house a shopping center and in which maximum traffic flow will occur past each of the individual shopping units.

It is a still further object of the invention to provide an improved building that may be used for a shopping center and wherein the display areas of each of the units has maximum visibility.

*SUMMARY OF THE INVENTION*

A building embodying this invention is adapted to house a plurality of separate units. The building is comprised of a first series of inclined ramps that extend substantially parallel to each other and are inclined at an acute angle to the horizontal. A second series of inclined ramps is spaced laterally from the first series and is comprised of parallelly extending ramps disposed at an acute angle to the horizontal. The inclined ramps of each series are connected at one end of the building by a series of connecting levels and are connected at the opposite building end by a second series of connecting levels.

*Another feature of the invention adapted to be embodied in a building adapted to provide a plurality of separate units and maximum visibility of the unit fronts. The building comprises first and second series of levels extending from the end of the building to the other and each of which provides for units thereupon spaced from walkways provided on the levels in front of the unit. The first and second series of levels are separated by a mall with the walkways of each series adjoining the mall. The levels of the first series are arranged in a nonparallel relationship with the levels of the second series for permitting the viewing of the unit fronts of a plurality of one series of levels from the walkway of one level of the other series. Access ways extend from the levels of the first series to the levels of the second series for facilitating the movement of people between the levels of the series.*

Other objects and advantages of the invention will become more apparent as this description proceeds, particularly when considered in conjunction with the accompanying drawings, wherein:

Figure 1:
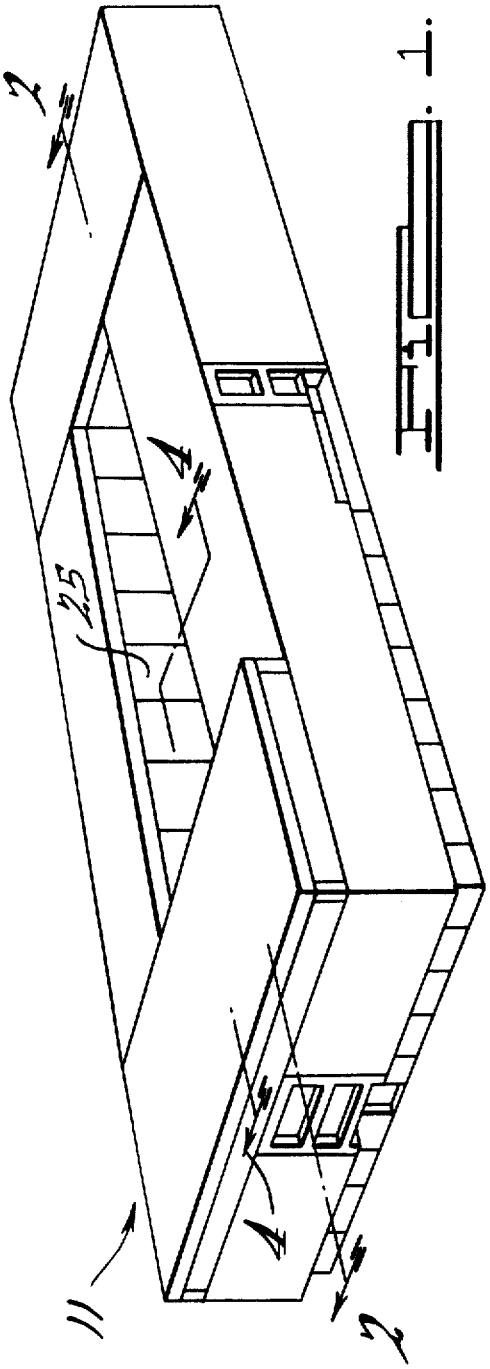
FIG. 1 is a perspective view of a building embodying this invention.
Figure 2:
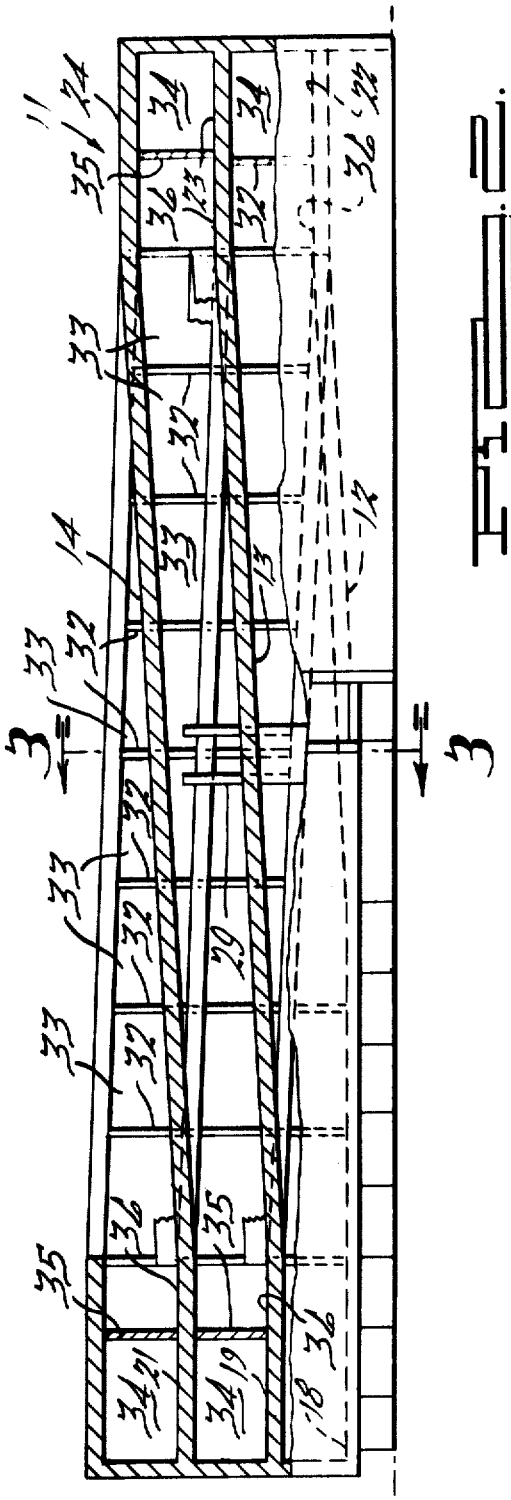
FIG. 2 is a partial cross sectional view taken generally along the line 2—2 in FIG. 1.
Figure 3:
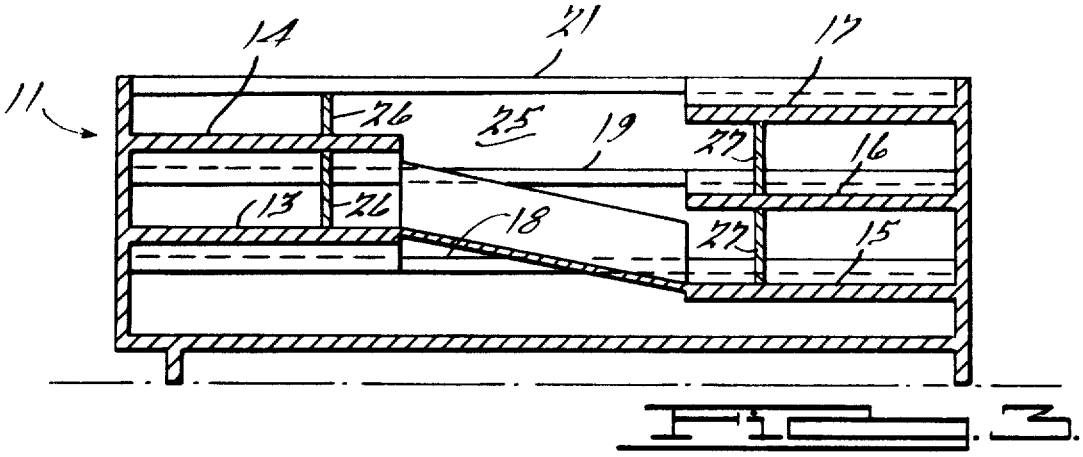
FIG. 3 is a cross sectional view taken along the line 3—3 in FIG. 2.
Figure 4:
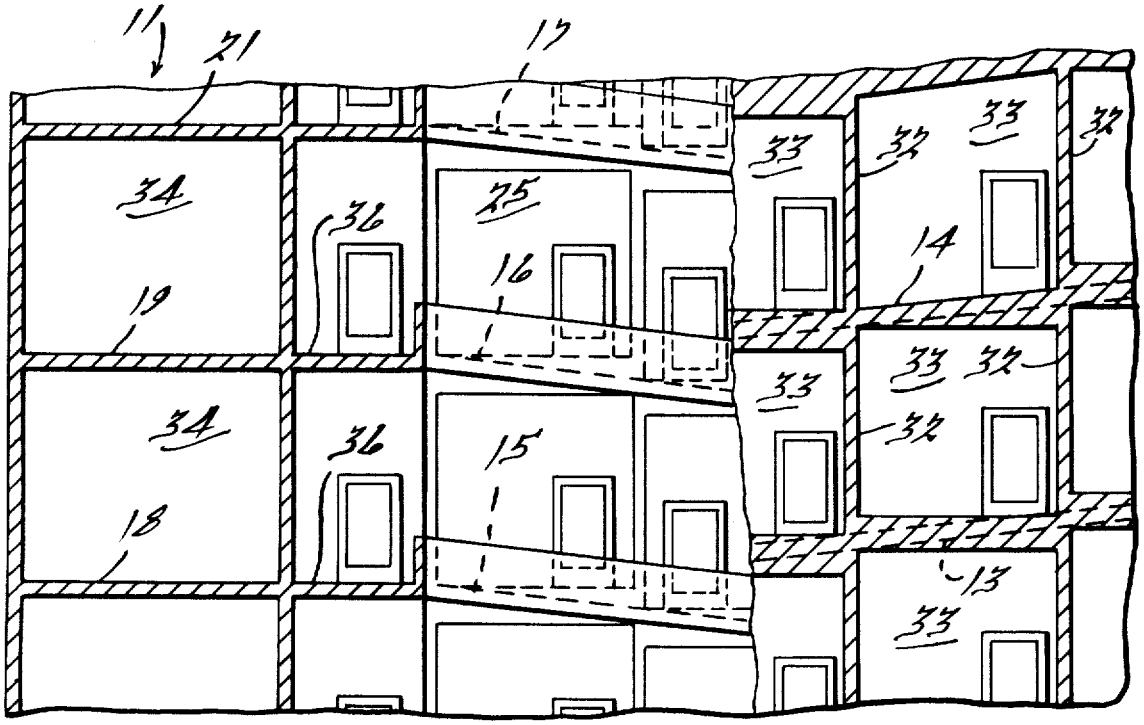
FIG. 4 is an enlarged cross sectional view taken generally along the line 4—4 in FIG. 1.
Figure 5:
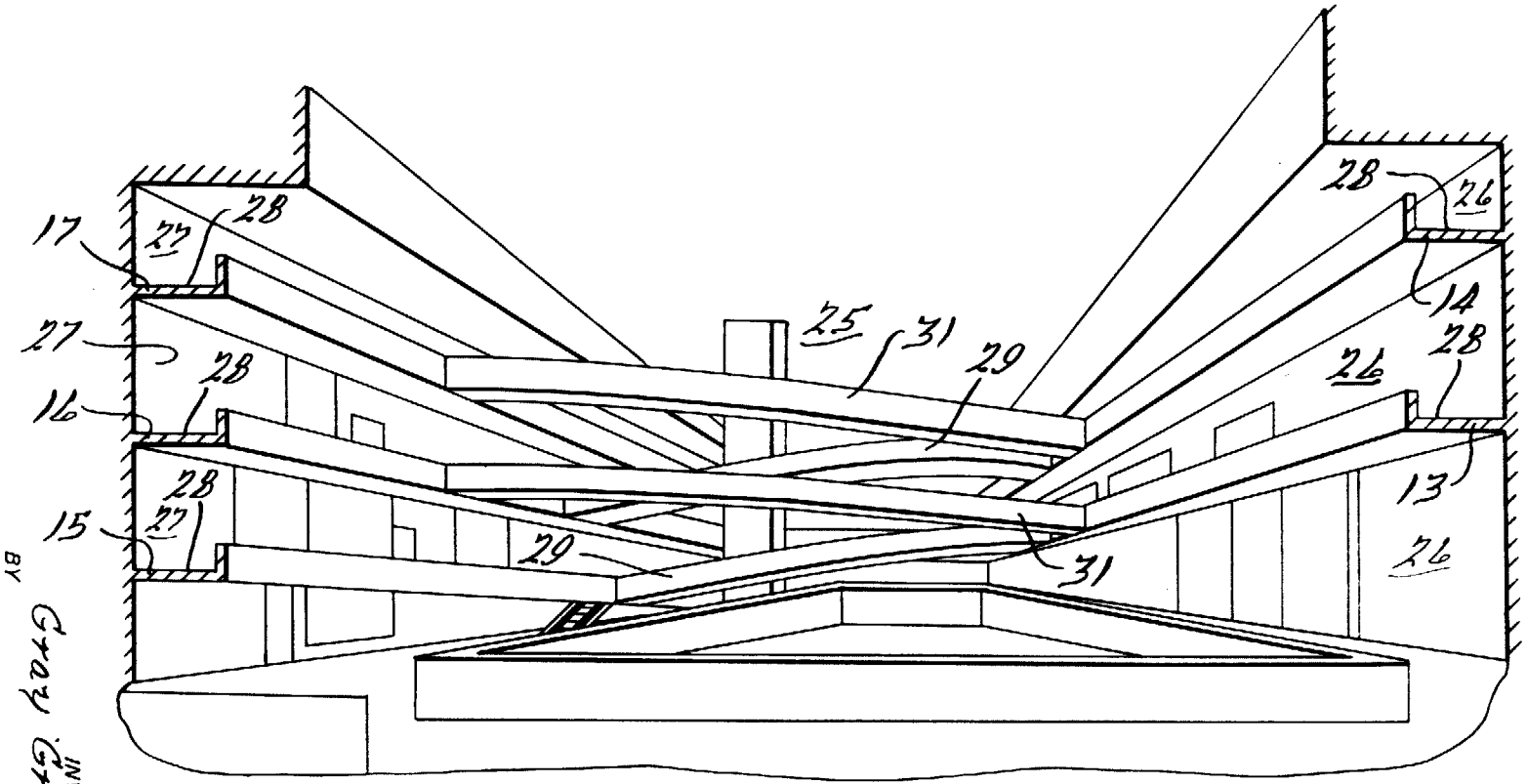
FIG. 5 is a perspective view showing the mall area of the building on a larger scale.

Referring now in detail to the drawings and in particular to the embodiment in FIGS. 1 through 6, a building embodying this invention is indicated generally by the reference numeral 11. The building to be described is a shopping or retail center, but it is to be understood that it may house other types of separate units. For example, the building 11 may house residential units, professional offices, or may be made up of a mixture of residential, office and retail units.

Figure 6:
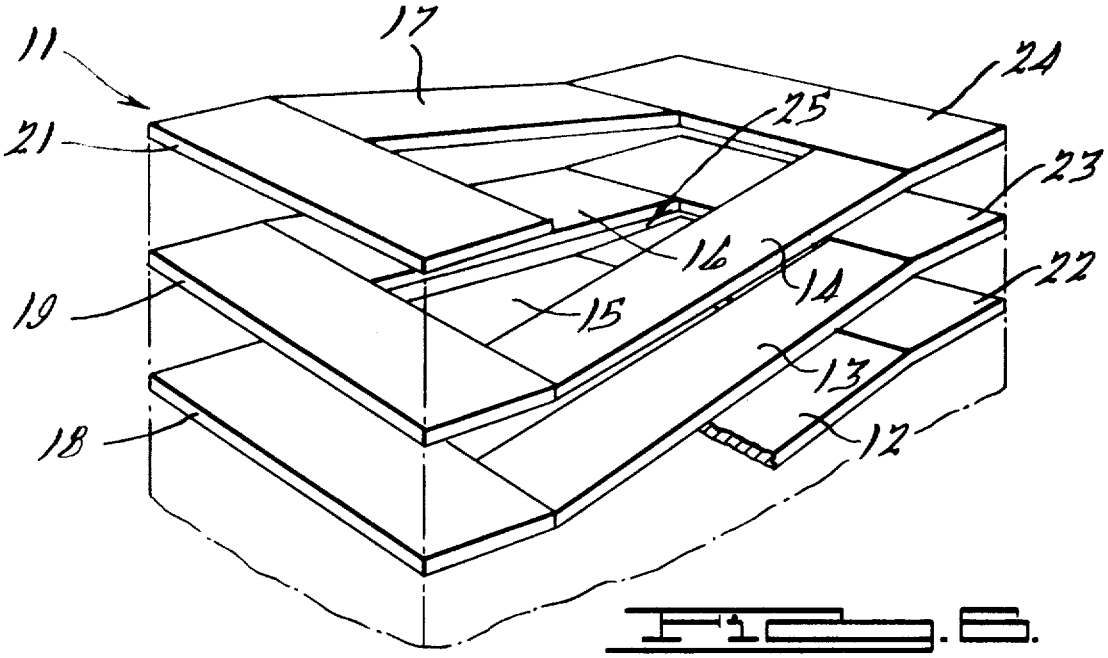
FIG. 6 is a schematic view illustrating the interrelation between the various levels of the building shown in FIGS. 1 through 5.

The floor layout of the building 11 may be best understood by reference to FIG. 6 wherein the various floor levels are illustrated schematically. The floor levels are made up of a first series of inclined ramps 12, 13 and 14 that are parallel to each other and extend at a small acute angle with respect to the horizontal. The ramps 12, 13 and 14 extend upwardly from one end of the building and lie at an angle that is preferably no greater than about 5° to the horizontal. In a preferred embodiment of the invention, the ramps 12, 13 and 14 lie at a 2° angle to the horizontal. The reason for the small acute angle will become more apparent as this description proceeds.

Spaced laterally from the inclined ramps 12, 13 and 14 is a second series of inclined ramps 15, 16 and 17 that extend upwardly from the opposite end of the building. The ramps 15, 16 and 17 also are disposed in parallel relationship with respect to each other at an acute angle to the horizontal. Preferably, the angle of the ramps 15, 16 and 17 is equal to the angle of the ramps 12, 13 and 14.

A first series of connecting levels 18, 19 and 21 is formed at the end of the building from which the ramps 12, 13 and 14 ascend. The connecting levels 18, 19 and 21 are preferably parallel to each other and extend substantially parallel to the horizontal plane. One end of the ramps 13 and 14 are integrally connected to the connecting levels 18 and 19, respectively. The adjacent ends of the ramps 15, 16 and 17 are connected to the opposite end of the connecting levels 18, 19 and 21, respectively. Thus, the connecting levels 18, 19 and 21 provide a horizontal connection between the adjacent ends of the inclined series of ramps.

At the opposite end of the building, a second series of connecting levels 22, 23 and 24 is provided. The connecting levels 22, 23 and 24 are parallel to each other and substantially parallel to the horizontal. One end of the connecting levels 22, 23 and 24 is connected to the upper ends of the inclined ramps 12, 13 and 14. The other end of each connecting level is connected to the lower ends of the inclined ramps 15, 16 and 17. The connecting levels 22, 23 and 24, therefore, provide access between adjacent ends of the series of inclined ramps at the respective end of building 11.

The connecting levels 18, 19 and 21 are spaced a considerable longitudinal distance from the connecting levels 22, 23 and 24, as has been noted, and the inclined ramps 12, 13 and 14 are spaced laterally from the inclined ramps 15, 16 and 17. This spacing provides an open air mall area, indicated generally by the reference numeral 25, in the center of the building. This mall area is shown in more detail in FIG. 5.

Vertically extending walls 26 and 27 are formed on each series of the inclined ramps spaced inwardly from the mall to form the outer surfaces of units which may function as stores, office spaces, or living areas on each inclined ramp. The inward spacing of the walls 26 and 27 provides sidewalks or walkways, indicated generally by the reference numeral 28, on the side of each ramp adjacent the mall 25. Intermediate the ends of the inclined ramps 12–17, transversely extending connecting ramps 29 are provided that connect the center of each of ascending ramps at one side of the building with the center of the next lower descending ramps at the other side of the building. Adjacent the ramps 29 are formed transverse etxending ramps 31 that connect each of the inclined ramps at one side of the building with the next higher adjacent ramp at inclined at the other side of the building.

The outer walls 26 and 27 coact with vertically extending walls 32 on each of the inclined ramps to provide individual units, as indicated generally by the reference numeral 33. As has been noted, the units 33 may be stores, office spaces or living areas. It will be noted from FIGURE 5 that the facing walls 26 and 27 provide a coextensive display area that may be viewed conveniently from any level so that substantially all of the stores within the building 11 may be viewed from any place therein.

Although the floor of each of the units 33 is inclined slightly due to the incline of the ramps 12, 13, 14, 15, 16 and 17, the incline is not sufficient to become noticeably objectionable to occupants of the units 33. If, however, it is desired to provide a completely level floor in any of the units, the floor may be provided with appropriate overlay that will provide the desired horizontal surface.

The connecting levels 18, 19, 21, 22, 23 and 24 are also divided into units 34 which may be utilized for any desired purpose such as stores. The units 34 have outer walls 35 that are spaced inwardly from the mall 25 so as to provide a walkway or sidewalk 36 in front of the units 34. The sidewalks 36 are connected to the sidewalks 28 to provide a continuous generally spiral sidewalk area around the mall 25. It should be readily apparent, particularly by reference to FIGURE 6, that a person entering the building 11 may walk up the inclined ramp 12 to the first connecting level 22 and then to the second inclined ramp 15 and thus in a somewhat screw threaded manner around the building 11 until the uppermost level is reached. Due to the relatively gradual angle of the inclined ramps 12, 13, 14, 15, 16 and 17, the persons will not notice their gradual ascent. Thus, it should be readily apparent that the traffic pattern in the building 11 causes maximum exposure to all of the store units contained therein. The connecting ramps 29 and 21 can be utilized, however, to facilitate crossing over between the inclined ramps if desired and, elevators (not shown) may interconnect the various ramps or connecting levels.

In the embodiment just described, all of the inclined ramps are of uniform width and thus a generally rectangular exterior shaped building is provided. If residential or urban renewal area is desired, an exposed sun deck or yard may be provided on each floor by making the ramps of decreasing width progressing toward the top of the building. Such an embodiment is shown in FIGURE 7.

Figure 7:
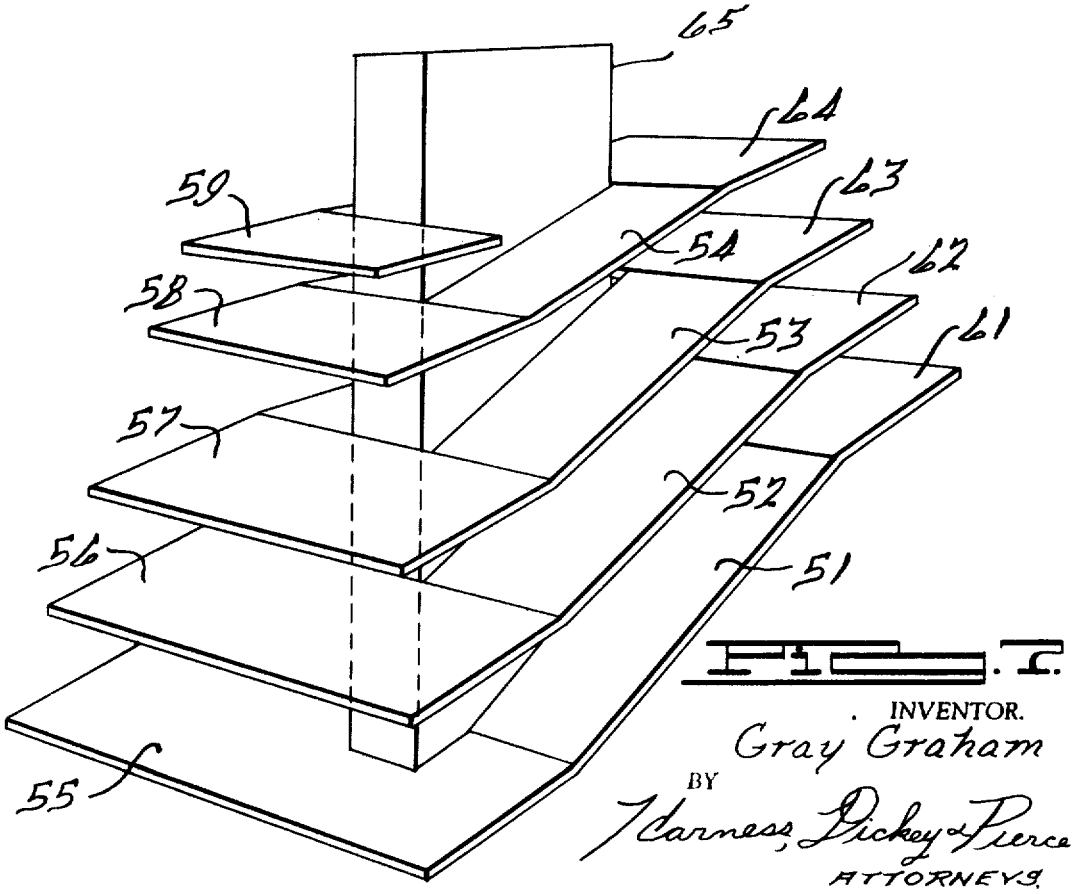
FIG. 7 is a schematic view, in part similar to FIG. 6, showing another embodiment of the invention.

In the embodiment in FIGURE 7, a first series of inclined ramps 51, 52, 53 and 54 extend at a small acute angle to the horizontal. Oppositely extending ramps are provided on the opposite side of the building. The inclined ramps are joined by connecting levels 55, 56, 57, 58 and 59 at one end of the building and connecting levels, 61, 62, 63 and 64 at the other end of the building. It will be noted that inclined ramps 51 through 54 decrease in width to ward the top of the building so that a portion of their outer periphery will be exposed to give a sun deck area thereto. Of course, it would be possible to alter the width inwardly so that a mall of increasing width were providing along the height of the building. If desired, a more conventional multi-story structure, indicated generally by the reference numeral 65, may replace the mall of the previous embodiment. In all regards the building shown schematically in FIGURE 7 may be considered the same as that in FIGURES 1–5.

It is to be understood that the specific construction of the improved building herein disclosed and described is presented for the purpose of explanation and illustration and is not intended to indicate limits of the invention.

What is claimed is:

1. A building adapted to house a plurality of separate units comprising a first series of inclined ramps extending substantially parallel to each other and being inclined at an acute angle to the horizontal, said first series of inclined ramps extending upwardly from one end of said building, a second series of inclined ramps extending upwardly from the other end of said building, said second series of ramps extending substantially parallel to each other and being inclined at an acute angle to the horizontal, said first and second series of inclined ramps being spaced laterally from each other to define a substantially open mall therebetween, a first series of parallel horizontally extending connecting levels at one end of said building, each of said first series of connecting levels being connected at one end thereof to one of said first series of inclined ramps and being connected at its other end to one of said second series of inclined ramps, a second series of parallel horizontally extending connecting levels at the other end of said building, each of said second series of connecting levels being connected at one end thereof to one of said first series of inclined ramps and being connected at its other end to one of said second series, said first and second series of connecting levels being longitudinally spaced from each other to define the longitudinal ends of said mall, said ramps and said connecting levels defining a floor surface of a generally spiral shape consisting of a ramp of the first series terminating at one end of a connecting level of the first series, the connecting level of the first series terminating at its other end at one end of a ramp of the second series, the other end of the ramp of the second series terminating at one end of a connecting level of the second series, the other end of the connecting level of the second series terminating at one end of a ramp of the first series and so on, and means providing a plurality of units upon each of said inclined ramps.

2. A building as set forth in claim 1 wherein a plurality of interconnecting ramps extend between the first and second series of inclined ramps, each of said interconnecting ramps being connected at one end thereof to one of said first series of inclined ramps and at its other to one of said second series of inclined ramps, said interconnecting ramps being spaced between the connecting levels and extending across said mall.

3. A building as set forth in claim 1 wherein means provide units on each of the connecting levels and the units are spaced outwardly from the mall to provide a walking area between said units and said mall on said connecting levels.

4. A building as set forth in claim 1 wherein the means providing the units upon the inclined ramps are spaced outwardly of the mall to provide a walkway between said units and said mall on each of said ramps.

5. A building as set forth in claim 4 wherein each of the inclined ramps extends at an angle no greater than 5° to the horizontal.

6. A building as set forth in claim 4 wherein each of the inclined ramps extends at an angle substantially equal to 2° to the horizontal.

7. A building as set forth in claim 1 wherein the inclined ramps of each series of inclined ramps extend laterally beyond the next uppermost inclined ramp in the respective series to provide an exposed area at the periphery of each of said inclined ramps.

8. A building adapted to house a plurality of separate units comprising a first series of ramps extending upwardly from one end of said building, said first series of ramps extending substantially parallel to each other and being inclined at an acute angle to the horizontal, a second series of ramps extending upwardly from the other end of said building, said second series of ramps extending substantially parallel to each other and being inclined at an acute angle to the horizontal, said first and second series of inclined ramps being spaced laterally from each other, a first series of connecting levels at one end of said building, said first series of connecting levels extending substantially parallel to each other and being substantially parallel to the horizontal, each of said first series of connecting levels being connected at one end thereof one of said first series of inclined ramps and being connected at its other end to one of said second series of inclined ramps, and a second series of connecting levels at the other end of said building, said second series of connecting levels extending substantially parallel to each other and to the horizontal, each of said second series of connecting levels being connected at one end thereof to one of said first series of inclined ramps and being connected at its other end to one of said second series of inclined ramps, said ramps and said connecting levels defining a floor surface of a generally spiral shape consisting of a ramp of the first series terminating at one end of a connecting level of the first series, the connecting level of the first series terminating as its other end at one end of a ramp of the second series, the other end of the ramp of the second series terminating at one end of a connecting level of the second series, the other end of the connecting level of the second series terminating at one end of a ramp of the first series and so on.

9. A building as set forth in claim 8 wherein each of the inclined ramps extends at an angle no greater than 5° to the horizontal.

10. A building as set forth in claim 8 wherein each of the inclined ramps extends at an angle substantially equal to 2° to the horizontal.

11. A building as set forth in claim 8 wherein the inclined ramps of each series of inclined ramps extend laterally beyond the next uppermost inclined ramp in the respective series to provide an exposed area at the periphery of each said inclined ramps.

*12. A building adapted to house a plurality of separate units and provide maximum visibility of the unit fronts, said building comprising a first series of levels extending from one end of the building to the other, said first series of levels providing for units thereon spaced from walkways provided on said first series of levels in front of said units, a second series of levels extending from one end of the building to the other, said second series of levels providing for units thereon spaced from walkways provided on said second series of levels in front of said units, said first and said second series of levels being separated by a mall with the walkways of each of said series adjoining said mall, the levels of said first series being arranged in nonparallel relationship with the levels of said second series for permitting the viewing of the unit fronts of a plurality of levels of one series of levels from a walkway on one level of the other series, and access ways extending from the levels of said first series to the levels of said second series for facilitating movement of people between the levels of said series.*

*13. A building as set forth in claim 12 wherein access ways between the levels are provided at each end of the building.*

*14. A building as set forth in claim 13 wherein access ways between the levels are provided between the ends of the building and across the mall.*

*15. A building as set forth in claim 12 wherein access ways between the levels are provided at the ends of the building and between the ends of the building and across the mall.*

References Cited

The following references, cited by the Examiner, are of record in the patented file of this patent or the original patent.

UNITED STATES PATENTS

| | | | |
|---|---|---|---|
| 3,105,999 | 10/1963 | Piazolo | 52—236 |
| 3,290,837 | 12/1966 | Weston | 52—236 |

JOHN E. MURTAGH, Primary Examiner

U.S. Cl. X.R.

52—236